United States Patent [19]
Tanabe et al.

[11] Patent Number: 5,347,550
[45] Date of Patent: Sep. 13, 1994

[54] CORE OF LIGHT-WATER REACTOR

[75] Inventors: Akira Tanabe, Tokyo; Ritsuo Yoshioka; Makoto Ueda, both of Yokohama; Koichi Sakurada, Narashino; Shouichi Watanabe, Ibaraki, all of Japan

[73] Assignee: Kabushiki Kaisha Toshiba, Kawasaki, Japan

[21] Appl. No.: 34,670

[22] Filed: Mar. 22, 1993

Related U.S. Application Data

[63] Continuation of Ser. No. 544,053, Jun. 22, 1990, abandoned, which is a continuation of Ser. No. 173,786, Mar. 28, 1988, abandoned.

[30] Foreign Application Priority Data

Mar. 28, 1987 [JP] Japan .................................. 62-72990
Apr. 9, 1987 [JP] Japan .................................. 62-85748

[51] Int. Cl.$^5$ .......................... G21C 3/30; G21C 5/20; G21C 7/04
[52] U.S. Cl. ..................... 376/173; 376/419; 376/420; 376/423; 376/425; 376/428; 376/435
[58] Field of Search ............... 376/173, 172, 347, 420, 376/425, 423, 428, 435, 419

[56] References Cited

U.S. PATENT DOCUMENTS

| 2,852,458 | 9/1958 | Dietrich et al. | 376/339 |
|---|---|---|---|
| 3,145,149 | 8/1964 | Imhoff | 376/435 |
| 3,147,191 | 9/1964 | Crowther | 376/420 |
| 3,211,621 | 10/1965 | Creagan | 376/173 |
| 3,212,983 | 10/1965 | Kornbichler | 376/435 |
| 3,929,565 | 12/1975 | Fredlin et al. | |
| 4,131,511 | 12/1978 | Mordarski et al. | 376/419 |
| 4,257,847 | 3/1981 | Gibby et al. | 376/420 |
| 4,273,616 | 6/1981 | Andrews | 376/428 |
| 4,355,002 | 10/1982 | Hosokawa et al. | 376/428 |
| 4,393,510 | 7/1983 | Lang et al. | 376/420 |
| 4,507,259 | 3/1985 | Cowell et al. | 376/173 |
| 4,609,522 | 9/1986 | Davidson et al. | 376/435 |
| 4,631,166 | 12/1986 | Camdem, Jr. | 376/435 |
| 4,636,352 | 1/1987 | Boyle | 376/419 |

FOREIGN PATENT DOCUMENTS 0128193 10/1980 Japan .................................. 376/420
56-10284 2/1981 Japan .

OTHER PUBLICATIONS

Nuclear Technology, vol. 48, (Apr. 1980), pp. 128–149, Durst et al.

Primary Examiner—Behrend E. Harvey
Attorney, Agent, or Firm—Foley & Lardner

[57] ABSTRACT

A core of a light-water reactor comprises a plurality of fuel assemblies each including a number of fuel rods. The fuel rod is provided with at least one area interposed between fuel areas in a clad of the fuel rod. The interposed area contains extremely reduced or substantially no fissile nuclide. At least two areas or layers with high enrichment of the fissile nuclide are formed in the axial direction of the reactor by the location of the interposed areas throughout the whole fuel assemblies arranged in the light-water reactor core.

10 Claims, 7 Drawing Sheets

CORE OF LIGHT-WATER REACTOR

This application is a continuation-in-part, continuation, division, of application Ser. No. 07/544,053, filed Jun. 22, 1990, (now abandoned) which is a continuation of application Ser. No. 07/173,782, filed Mar. 28, 1988, (now abandoned).

BACKGROUND OF THE INVENTION

This invention relates to a core of a light-water reactor particularly provided with a large shut-down margin for the reactor core.

The core of a light-water reactor generally comprises a number of fuel assemblies each constructed by a plurality of fuel rods which are arranged in a regular fashion, and a light water as a coolant also acting as a moderator flows between the respective fuel rods from a lower portion towards an upper portion thereof to remove the heat generated by the fuel rods. Accordingly, the light water is highly heated under high pressure when the light-water reactor is operated or run with a high output power or a rated output power.

With the reactor core of the type described above, most of the control rods are withdrawn from the reactor core during the operation of the nuclear reactor, whereas all the control rods are inserted into the core during the reactor shut-down time. Even when a control rod having the largest reactivity is withdrawn from the reactor core due to a certain reason, the shut-down condition has to be safely maintained with an appropriate shut-down margin.

The concentration (enrichment) of a fissile nuclide contained in a fuel used in the reactor should be increased from an economical view point. The nuclear fission is easily caused by increasing the enrichment of the fuel, which will result in a smaller shut-down margin of the core. The lowering of the core shut-down margin may cause a condition where the reactor is not shut-down in a situation requiring a reactor shut-down. A sufficient shut-down margin should be thus ensured for the reactor, but the ensuring of the sufficient shut-down margin may go against the economical requirement. Taking these facts into consideration, in the conventional technique, a burnable poison is added in the fuel or boron solution is added in the coolant in order to ensure the sufficient shut-down margin, and on the other hand, an improvement for responding to the increasing economical requirement has also been required.

Concerning a boiling-water reactor (BWR), steam voids are formed in the area of the location of the fuel assemblies except the lowest portions thereof and the voids move up towards the upper portion of the reactor core, and accordingly, the void fraction in the BWR becomes high towards the upper portion of the reactor core. As a result, the moderation characteristics for neutrons is lowered and hence the fission rate is also lowered. In other words, the burning progresses at the lower portion of the reactor core and the burning is delayed at the upper portion thereof. In order to obviate this phenomenon; that is, in order to suppress the lowering of the output power at the upper portion of the reactor core, the enrichment of the fissile nuclide contained in the fuel disposed at the upper portion of the reactor core is increased.

However, the increasing of the void fraction at the upper portion of the reactor core and the increasing of the enrichment of the fissile nuclide at the upper portion of the reactor core will result in reduced subcriticality at the upper portion of the reactor core during a core shut-down time of the reactor. On the other hand, in order to increase the burnup and elongate the operation cycle of the reactor for improving the economical requirement, it will be desired to further increase the enrichment of the fuel. However, these facts result in the further reduction of the subcriticality at the upper portion of the reactor core, and finally, there may exist a situation where the reactor is not shut down. Because of this problem, in the conventional technique, it is considerably difficult to increase the burnup in the reactor core.

SUMMARY OF THE INVENTION

An object of this invention is to improve the conventional technique of this field of art and to provide a light-water reactor core capable of improving the reactor shut-down margin to reduce the operational and fuel cycle costs of a nuclear power plant.

This and other objects can be achieved according to this invention by providing a light water reactor core comprising a plurality of fuel assemblies each constructed by a number of fuel rods and a number of control rods to be inserted between the fuel assemblies, each of the fuel rods being provided at an axially predetermined portion with at least one interposed area containing extremely reduced or substantially no fissile nuclide so as to form at least two areas having high enrichment of a fissile nuclide at portions of the fuel assemblies vertically divided by the location of the interposed areas of the respective fuel rods.

According to this invention, the fuel rod is divided vertically into at least two portions by providing an interposed area containing extremely reduced or substantially no fissile nuclide. The mutual relationship, i.e. binding effect, of the thermal neutrons in the fuel areas between which the interposed area is located is specifically reduced at the shut down time of the light-water reactor by the provision of the interposed areas throughout the whole fuel assemblies, and accordingly, the subcriticality of the reactor core during the shut down time can be made large.

According to one preferred embodiment of this invention, the interposed area is located in the fuel rod so that the effective multiplication factors of the areas having the high enrichment of the fissile nuclide in the fuel areas divided by the interposed area is substantially equal to each other at a time of reduced reactor shut-down margin during the operational cycle of the light-water reactor.

According to another preferred embodiment of this invention, the interposed area has an axial width within a length between a thermal neutron diffusion length and a length twice thereof during a power operation of the reactor, and an axial width corresponding to or slightly more than the thermal neutron diffusion length during a cold shut-down time.

DESCRIPTION OF THE PREFERRED EMBODIMENTS

Before the detailed description of the preferred embodiments of this invention, the principal theory or basic principle according to this invention will be described hereunder with reference to the accompanying drawings.

Figure 1:
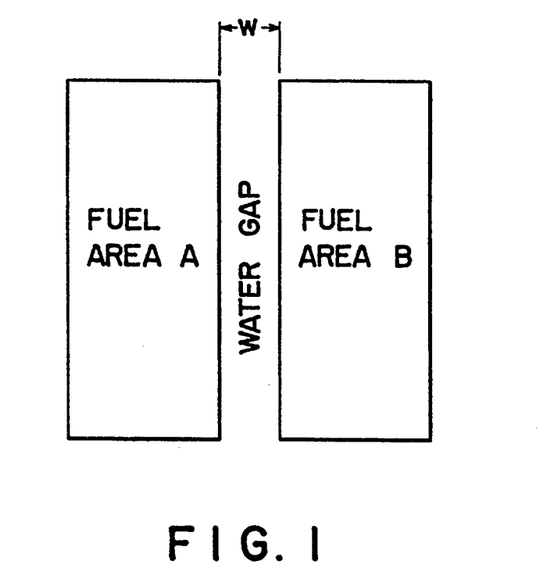
FIG. 1 is an illustration for the explanation of the basic principle of this invention.

Referring to FIG. 1, it is assumed that a water gap having a width w (no nuclear fuel existing area and only a water existing area) exists between two fuel existing zones A and B represented so as to have a rectangular cross section, respectively. In this case, the relationship between the effective multiplication factor (e.m. factor) $k_{eff}$ and the width w of the water gap is represented by a graph shown in FIG. 2, in which the solid line represents the case where the reactor is in a low temperature state such as during the reactor shut-down period and the broken line represents the case where the reactor is operated at a high temperature such as during the reactor operation period. From the graph of FIG. 2 it will be found that the increasing of the width w of the water gap results in a rapid lowering of the e.m. factor $k_{eff}$ in the low temperature condition of the reactor, whereas in the high temperature operating condition of the reactor, the e.m. factor $k_{eff}$ somewhat increases in a certain range when the width w is increased and even when the e.m. factor $k_{eff}$ lowers, the degree of lowering the e.m. factor $k_{eff}$ is very small. Namely, in the low temperature condition of the reactor core, the existence of the water gap between the fuel areas A and B increases the core separating function, which however is weakened in the high temperature condition of the reactor. This is explained by the fact that the lowering of the core temperature increases the water density and strengthens the separation shielding function due to the existence of the water in the water gap.

Figure 2:
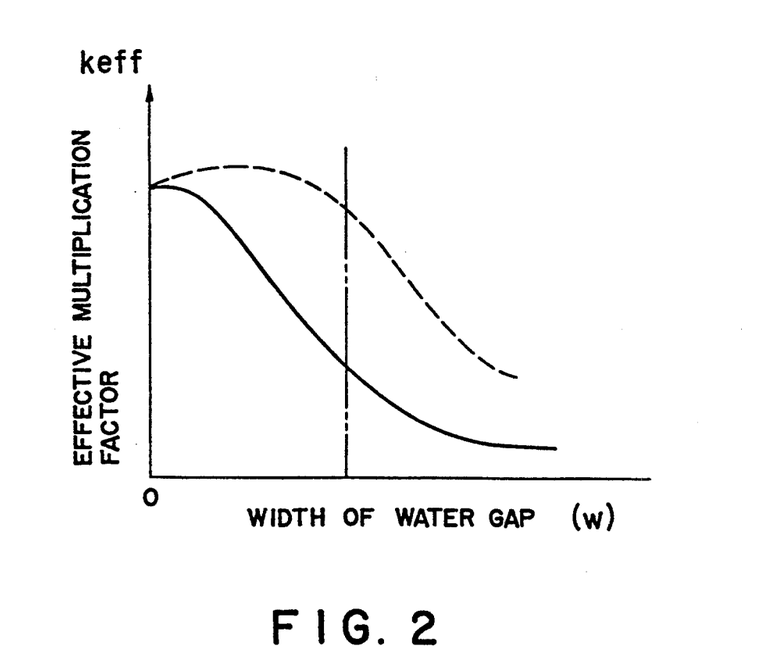
FIG. 2 is a graph representing the relationship between the effective multiplication factor in the reactor core and the width of the water gaps as an interposed area mentioned with reference to FIG. 1.

As described hereinabove, this invention notices and utilizes the relationship between the existence of the water gap and the effective multiplication constant (e.m. factor) $k_{eff}$, and aims to improve the shut-down margin of the reactor in a manner such that the e.m. factor $k_{eff}$ is made small during the reactor shut-down period and the e.m. factor $k_{eff}$ is hardly made small or is increased rather than lowered during the power operation period of the reactor.

The reactivity $\rho$ of the reactor is generally defined by $$\rho = \frac{k_{eff} - 1}{k_{eff}},$$

and the subcriticality $\rho_o$ is expressed by $\rho_o = -\rho$, thus the subcriticality $\rho_o$ is expressed as $$\rho_o = \frac{1}{k_{eff}} - 1.$$

This equation means that the increasing of the e.m. factor $k_{eff}$ results in the lowering of the subcriticality $\rho_o$ (i.e. approaching the critical state) and the lowering of the e.m. factor $k_{eff}$ increases the subcriticality $\rho_o$, thus increasing the shut-down margin of the reactor core.

According to this invention, as referred to hereinabove, the shut-down margin of the reactor core can be significantly improved by lowering the effective multiplication factor $k_{eff}$ when the shut-down margin of the reactor is reduced during the operational cycle thereof so as to increase the subcriticality $\rho_o$.

It is also desired that the width w of the water gap, i.e. the width of the area containing an extremely reduced enrichment of the fissile nuclide or substantially no fissile nuclide be a length between a thermal neutron diffusion length and a distance twice thereof during the reactor power operation period and a distance corresponding to or slightly larger than the thermal neutron diffusion length during cold shut-down.

Figure 3:
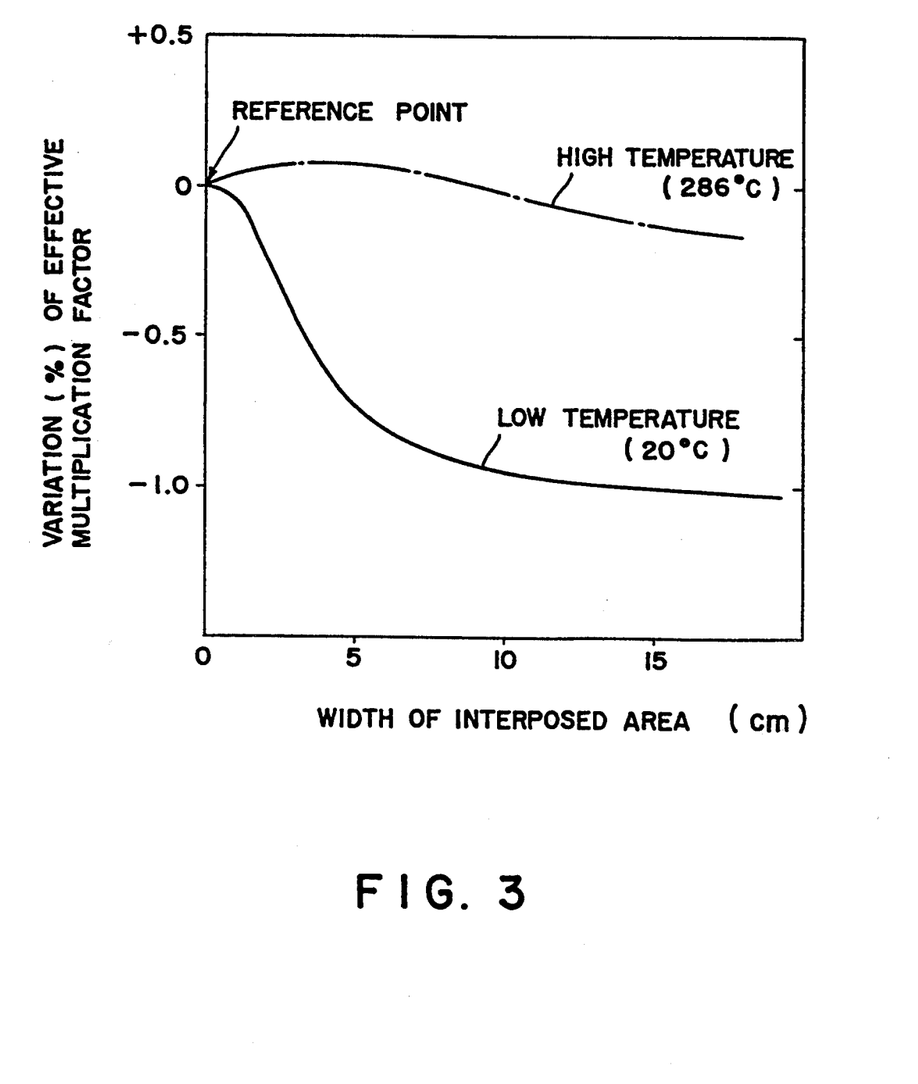
FIG. 3 is a graph representing the relationship between the width of the interposed area and the variation of the effective multiplication factor of the reactor core.

FIG. 3 shows a graph representing the relationship between the width of an interposed fuel area with remarkably reduced enrichment of the fissile nuclide or substantially no fissile nuclide (hereinafter called interposed area) and the variation (%) of the e.m. factor $k_{eff}$ of the reactor core. This relationship was obtained under the condition of the initial average enrichment: 3.7 weight %, burnup: 28 GWd/t, and no insertion of the control rod with a BWR. Concerning the BWR of this character, the subcriticality during the core shutdown time is maximumly reduced at an area near a position apart from the upper end of the core by a length about one-fourth (¼) the length thereof. On the basis of this fact, interposed areas were located horizontally in that area throughout the whole fuel assemblies constituting the core, and under this state, the widths of the interposed areas were varied to obtain the variation of the e.m. factor $k_{eff}$.

Referring to the graph of FIG. 3, the solid line represents the state in which the reactor does not substantially generate heat (20° C.) such as in the case of the reactor shut-down period and the one dot and dash line represents the state in the reactor operating cycle at a high temperature of 286° C. As shown in the graph, in the cold shut down time period time of the reactor, when the width of the interposed area is set to about 0 to 5 cm, the e.m. factor $k_{eff}$ rapidly decreases and when the width thereof is set to a value over 5 cm, the e.m. factor $k_{eff}$ is maintained to be substantially constant. The asymptotic value thereof is substantially equal to the e.m. factor $k_{eff}$ in one of the fuel areas divided by the interposed area, which is larger than that of the other one thereof.

In the high temperature operation period of the reactor, even when the width of the interposed area is set to about 0 to 10 cm, the e.m. factor $k_{eff}$ does not substantially change, and rather, the e.m. factor $k_{eff}$ increases in a width of about 3 to 6 cm. This is based on the fact that the shortage of the thermal neutron flux due to the shortage of the moderator is recovered by the moderator, i.e. water, supplied from the interposed area when the BWR is operated at a high temperature with voids generated.

In view of these results, with a BWR of the character described above, the horizontal arrangement of the interposed areas each having a width of about 3 to 6 cm at portions apart from the upper portion of the core by the length one-fourth of the total length throughout the core ensures the lowering of the e.m. factor $k_{eff}$ during the reactor shut-down time without substantially lowering the e.m. factor during the reactor operation time (rather, somewhat increasing the e.m. factor). Accordingly, in a case where the enrichment of the fissile nuclide is increased, the subcriticality during the reactor shut-down time can be made large, thus improving the shut-down margin of the reactor.

Figure 4A:
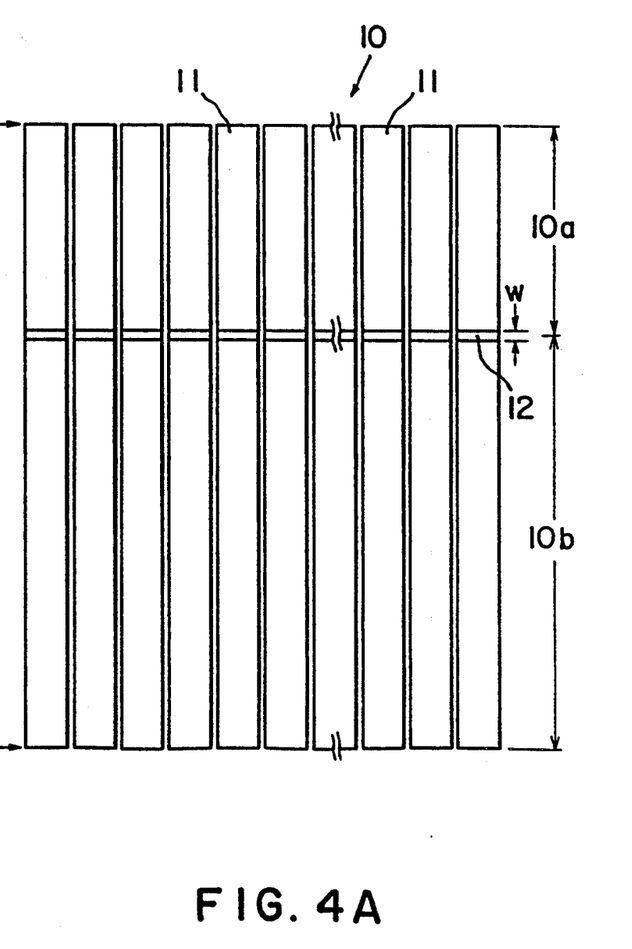
FIG. 4A is a schematic vertical section of a reactor core according to the first preferred embodiment of this invention.

FIG. 4A is an illustration of the arrangement of the fuel assembly each provided with the interposed area disposed in the core of the BWR in accordance with the aforementioned principle.

Referring to FIG. 4A, the reactor core 10 constructed by a plurality of fuel assemblies 11 each comprising a number of fuel rods, not shown, is horizontally divided into two vertical parts by providing the interposed areas 12 formed by gathering portions of the fuel rods having an extremely lowered degree of the enrichment of the fissile nuclide. The vertical width w of each of these interposed areas is about 3 to 8 cm.

Figure 4B:
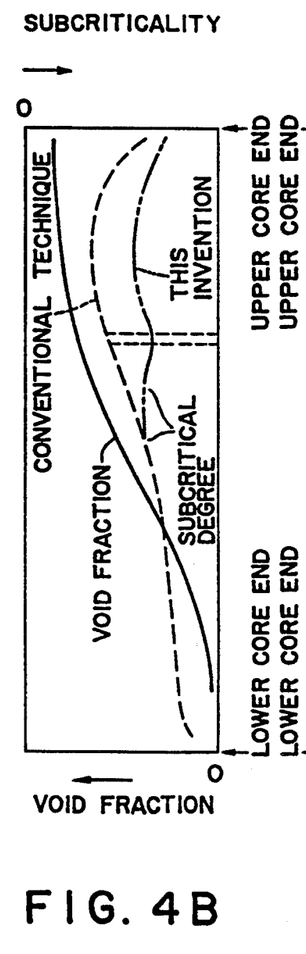
FIG. 4B is a graph representing a void fraction and distribution of a subcriticality in the axial direction of the reactor core of FIG. 4A.

With the BWR, as represented by the broken line in FIG. 4B, the reactor core has an area of a reduced subcriticality at a portion somewhat higher than the central portion of the core, so the interposed areas 12 are disposed at the area somewhat higher than the central portion of the core 10 according to this invention. The location of the interposed area 12, as a whole, is predetermined so that the effective multiplication factors $k_{eff}$ of the fuel areas 10a and 10b of the core 10 vertically divided by the location of the interposed area 12 are substantially the same with each other at a time when the reactor shut-down margin is reduced during the reactor operational cycle.

According to the location of the interposed areas throughout the reactor core, the variation of the subcriticality throughout the reactor core can be substantially reduced and the minimum subcriticality can be made large as shown by two-dots and dash line in FIG. 4B in comparison with the conventional technique.

Figures 5A, 5B:
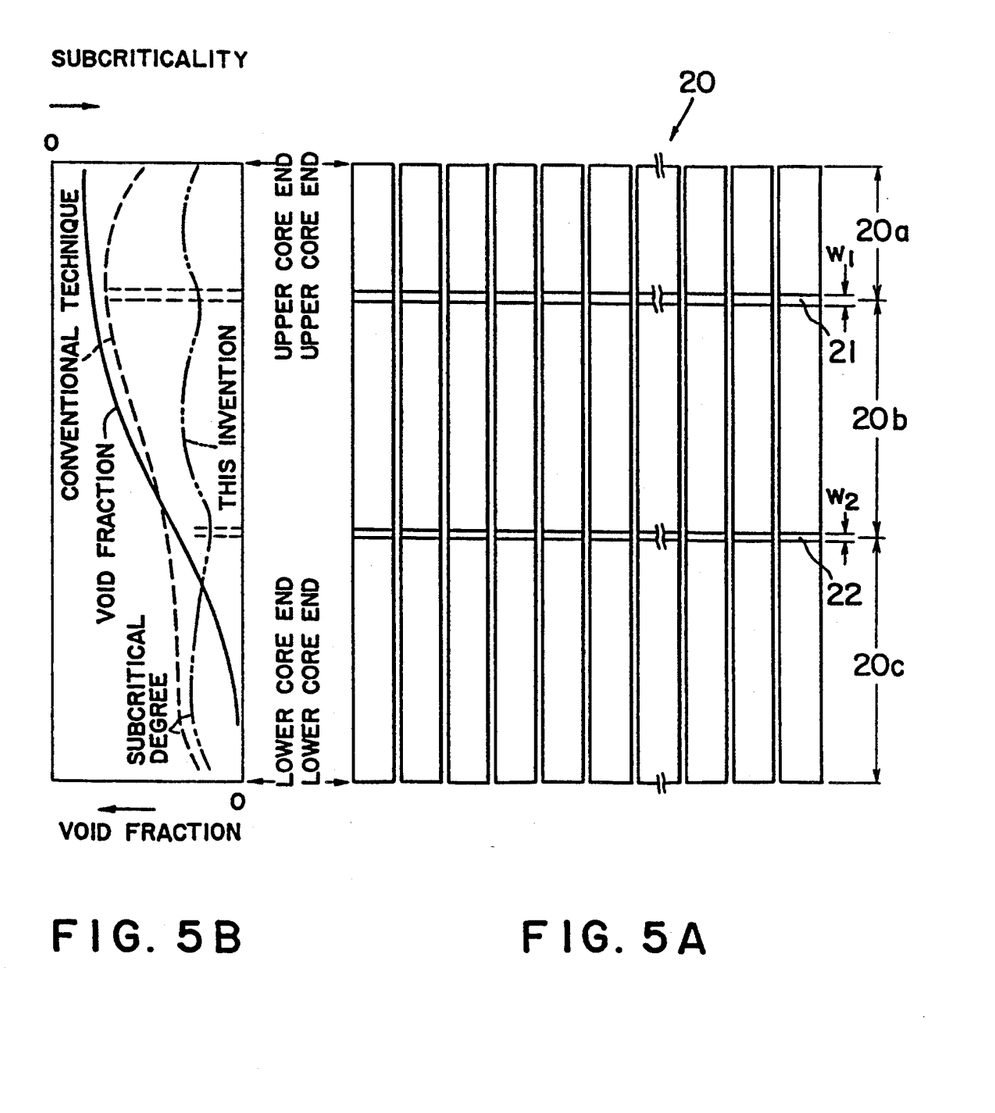
FIG. 5A is a schematic vertical section of a reactor core according to the second preferred embodiment of this invention.
FIG. 5B is a graph representing a void fraction and distribution of a subcriticality in the axial direction of the reactor core of FIG. 5A.

FIG. 5A is an illustration representing another embodiment according to this invention in which two-stages or two-layers of the interposed areas 21 and 22 are located in the core 20 of the BWR.

According to this embodiment, the reactor core 20 is divided into three vertical three fuel areas 20a, 20b and 20c by the interposed areas 21 and 22, and the location of the interposed areas 21 and 22 is predetermined so that the effective multiplication factors $k_{eff}$ of the fuel areas 20a, 20b and 20c are substantially the same with respect to each other at a time when the shut-down margin of the reactor is minimumly lowered during the reactor operational cycle. With the BWR, the subcriticality is small at the upper portion of the core 20 because of the high void fraction at that portion during the reactor operation, and accordingly, it is desired to design the core to have vertical lengths of the respective fuel areas 20a, 20b and 20c to be larger in this order. Although the vertical widths $w_1$ and $w_2$ of the interposed areas 21 and 22 are ranged commonly within about 3 to 8 cm, in an alternation, the width $w_2$ may be set to a value slightly smaller than the width $w_1$ for the reason described above.

According to the embodiment represented by the illustration of FIG. 5A, the subcriticality can be made large throughout the whole reactor core as shown by the two-dots and dash line.

Figure 6A:
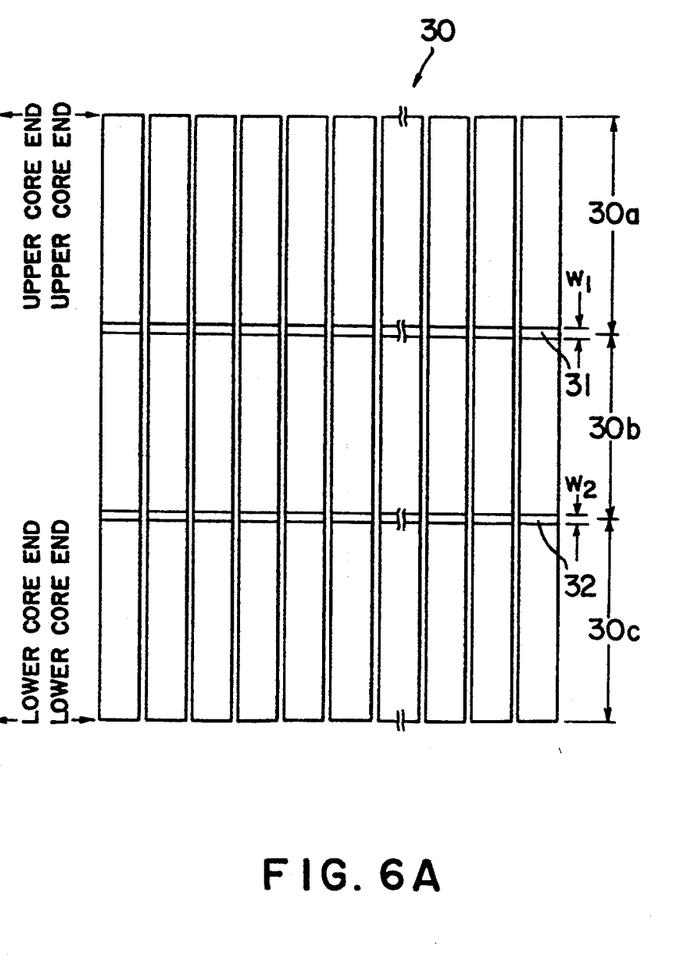
FIG. 6A is a schematic vertical section of a reactor core according to the third preferred embodiment of this invention.
Figure 6B:
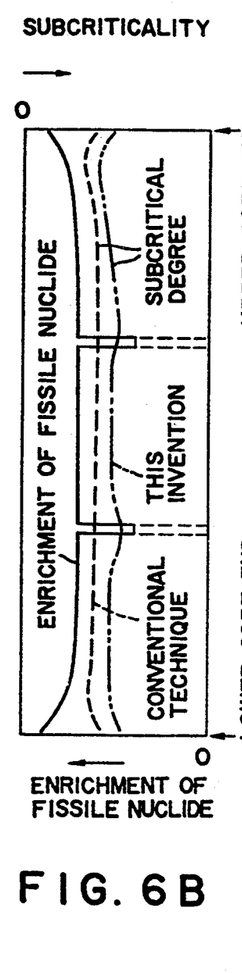
FIG. 6B is a graph representing an enrichment of fissile nuclide and distribution of a subcriticality in the axial direction of the reactor core of FIG. 6A.

FIGS. 6A and 6B represent an embodiment according to this invention which is applied to a pressurized water reactor (PWR). With the PWR, the void is not generated and the density variation due to the temperature variation of the moderator in the axial direction is small (for example, between 0.69 and 0.64). The power distributions in the axial direction of the reactor core are approximately symmetrical at the upper portion and the lower portion of the core, so the enrichments of the fissile nuclides contained in the fuel are also approximately symmetrical at the upper and lower portions thereof. The distribution of the subcriticality is, accordingly, approximately constant and symmetrical at the upper and lower portions of the core.

The core 30 of the PWR shown in FIG. 6A is provided with two stages or two layers of the interposed areas 31 and 32 so as to divide the core 30 into three vertical fuel areas 30a, 30b and 30c. The location of the interposed areas 31 and 32 are predetermined so that the effective multiplication factors $k_{eff}$ of the fuel areas 30a, 30b and 30c are substantially the same with each other at a time when the shut-down margin of the reactor is minimumly lowered during the reactor operational cycle. The vertical lengths of the respective fuel areas are to be made approximately equal to each other because of the substantially constant distribution of the subcriticality throughout the vertical direction of the PWR, but in practice, it is desired to design the intermediate fuel area 30b so as to have a length slightly smaller than those of the other fuel areas for the reason that the intermediate fuel area 30b is influenced by both of the other fuel areas 30a and 30c. The water density in the PWR is larger than that at the void generation time of the BWR by about two times, so the vertical widths $w_1$ and $w_2$ of the interposed areas 31 and 32 are designed to be smaller than the width $w_1$ and $w_2$, about 3 to 8 cm, of the interposed areas of the BWR, and in the preferred embodiment, the widths of about 3 to 5 cm are desired.

According to the embodiment illustrated by two-dots and dash line in FIG. 6B, the subcriticality can be made large throughout the reactor core.

Figure 7A:
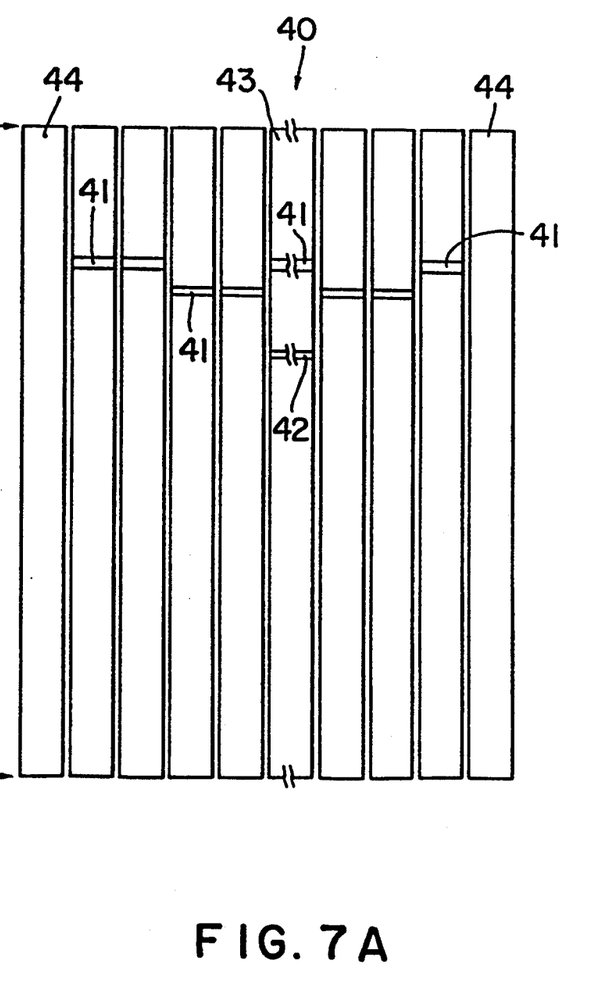
FIG. 7A is a schematic vertical section of a reactor core according to the further preferred embodiment of this invention.
Figure 7B:
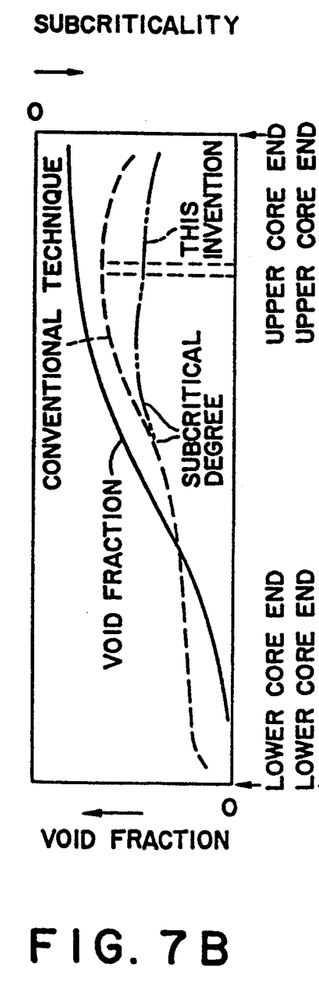
FIG. 7B is a graph representing a void fraction and distribution of a subcriticality in the axial direction of the reactor core of FIG. 7A.

FIGS. 7A and 7B represent the still further embodiment according to this invention, which aims to increase the reactor shut-down margin and to improve the power distribution in the reactor core in the axial direction thereof.

Referring to FIG. 7A, the interposed areas 41 are located at different levels in the fuel assemblies, i.e. reactor core, and another interposed area 42 is further located at a specified fuel assembly 43. In addition, the fuel assemblies 44 positioned at the outer peripheral portion of the reactor core 40 are not provided with any interposed area.

According to the arrangement of this embodiment shown in FIG. 7A, the subcriticality is made large and the reactor shut-down margin can be improved as shown in FIG. 7B. The power distribution in the axial direction of the reactor core can also be improved. The fuel assemblies 44 disposed at the outer peripheral portion of the core contact the water filling the core, and accordingly, at that portion the effect due to the location of the interposed areas in the fuel assemblies 44 is relatively small. Therefore, the initial object of this invention will be achieved even with locating no interposed area at that portion.

FIGS. 8A through 8D show vertical sections of fuel rods constituting the fuel assemblies according to this invention, respectively.

Figure 8A:
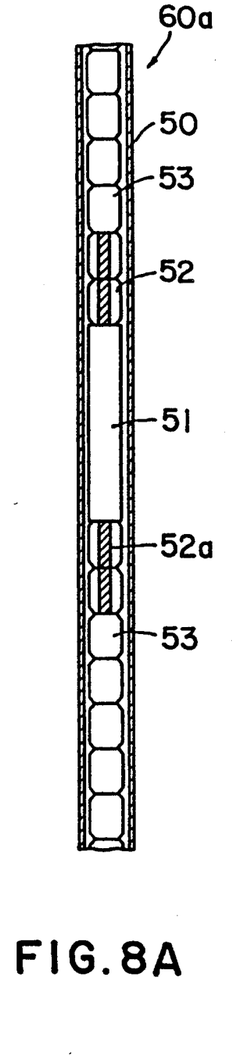
FIGS. 8A through 8D are vertical sections of fuel rods designed in accordance with the embodiments of this invention.

Concerning a fuel rod 60a shown in FIG. 8A, an area in which no fuel is contained, i.e. interposed area, is formed in a clad 50 in which fuel pellets are charged. The interposed area has a vertical length of about 5 cm and is filled with solid graphite 51 which provides a high temperature characteristic, less thermal neutron absorption ability and a function as a moderator. Porous (low density) ceramics such as $Al_2O_3$ or $ZrO_2$ may be utilized in place of the graphite 51. These ceramics have less moderating characteristics, but have excellent heat-resisting characteristics, thus less absorption of the thermal neutrons. In place of the solid graphite, $Al_2O_3$ or $ZrO_2$, a hollow graphite, hollow $Al_2O_3$, hollow $ZrO_2$, hollow natural uranium, hollow depleted uranium or the like is utilized to fill the interposed area, and the hollow portions of these elements are made as a gas plenum state when utilized.

The most significant characteristics to be required for the interposed area is that the thermal neutron absorption rate of the interposed area at the final stage of the reactor operational cycle is smaller than those of the fuel areas adjacent to the interposed area in the respective clad. The fuels adjacent to the graphite 51 generate power with peaks (spikes) each with a range of about 2 cm (5 cm, uppermost), which is disadvantageous in terms of the soundness of the fuel, so that respective two pellets 52, each of about 2 cm, and including burnable poisons 52a, are disposed at portions only near the axis of the fuel rod. However, since the outer peripheral portions of these pellets 52 do not contain any burnable poisons 52a, the power variation is relatively small throughout the operational cycle. As the operational cycle approaches the final stage, the absorption characteristics of the poisons 52a are reduced and the output power at these portions gently increases, and at this time, the mutual relationship i.e. binding effect between the thermal neutrons in the fuel areas between which the graphite is held in the clad increases, thus recovering the excess reactivity (kexcess) of the reactor core, whereby the reactor can maintain the operational cycle for a long period. Usually, the excess reactivity (kexcess) decreases at the final stage of the operational cycle, but according to the reactor core of this invention, the binding effect of the fuel areas holding the graphite therebetween increases at the time of starting the decreasing of the excess reactivity because of the elimination of the poisoning function of the burnable poison 52a. As a result of this fact, the excess reactivity increases, which is a unique and significant phenomenon according to this invention.

Figure 8B:
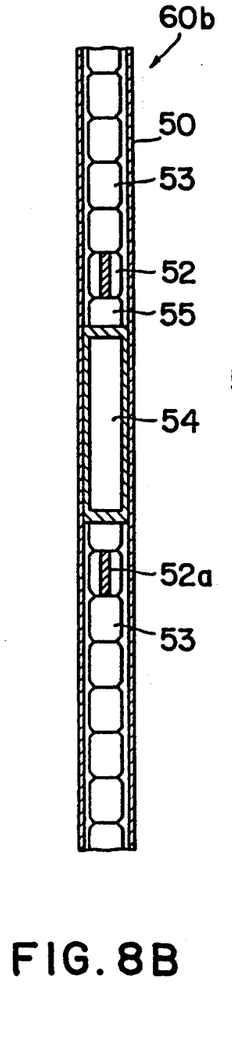

Concerning a fuel rod 60b shown in FIG. 8B, a tube 54 made of zircaloy having a small thermal neutron absorption cross section is inserted in the clad 50 instead of the graphite used in the fuel rod 60a of FIG. 8A. The zircaloy tube 54 is unsealed when it is used in the gas-plenum state, and when the tube is filled with $ZrH_2$, Be or BeO, a $H_2$ gas or He gas storing plenum is provided for the tube. In this fuel rod 60b, small pellets 55 as a thermal insulator, $Al_2O_3$, $ZrO_2$, depleted uranium and the like are interposed between the zircaloy tube 54 and the fuel pellets 53 to ensure the soundness of the fuel. It is desired to form the insulation pellet 55 by a burnable poison bearing pellet of $Al_2O_3$-$Gd_2O_3$, or depleted uranium $UO_2$-$Gd_2O_3$ and the like. It is also desired to dispose pellets 52 containing the burnable poisons 52a in the fuel pellets adjacently contacting the zircaloy tube 54 in the axial direction thereof, and preferably, the length of the pellet 52 zone has a length of about 2 cm (uppermost, 5 cm) from the end of the fuel pellet into which the pellet 52 is inserted. FIG. 8B shows an annular fuel pellet 52 into which a gadolinia bearing pellet of small diameter is inserted. In an alteration, the gadolinia may be entirely mixed throughout the pellet.

Figure 8C:
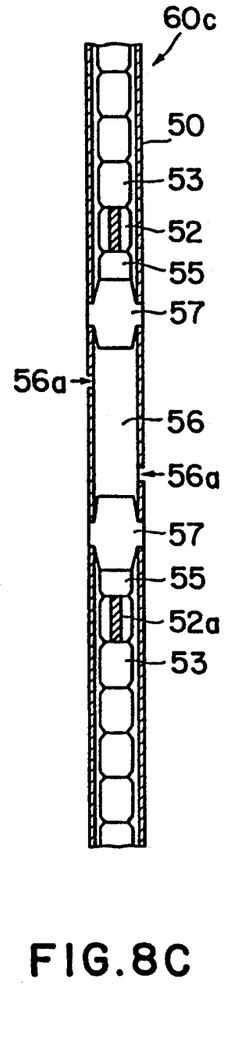

Concerning a fuel rod 60c shown in FIG. 8C, a pair of intermediate plugs 57 are disposed at the upper and lower portions in the clad 50 so as to define a hollow space 56 therebetween. Water supply ports 56a and 56b are formed through the clad 50 at the upper and lower portions of the hollow space 56 to introduce the moderator, i.e. water, into the clad 50. Thermal insulation pellets 55 are disposed at the upper and lower portions of the respective intermediate plugs 57, as shown, and pellets 52 containing the burnable poisons 52a are further disposed at the upper and lower portions of the respective thermal insulation pellets 55.

Figure 8D:
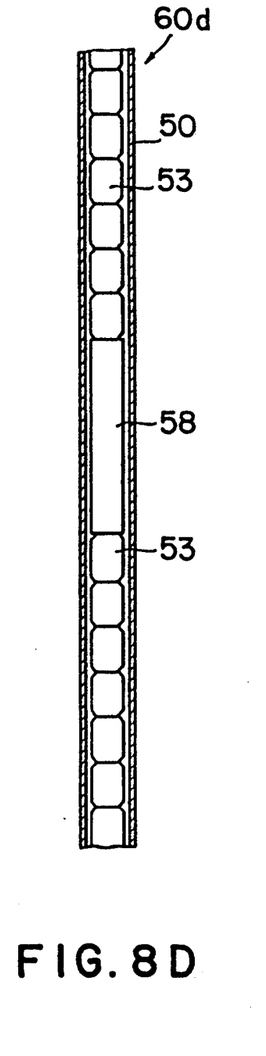

Concerning a fuel rod 60d shown in FIG. 8D, the fuel pellets 53 charged in the clad 50 are separated into two vertical sections by an interposed area or layer which is made by adding the burnable poison into the graphite (or $Al_2O_3$, $ZrO_2$ or $Al_2O_3$-$ZrO_2$).

As described hereinabove with reference to the preferred embodiments, according to this invention, the reactor core, i.e. fuel assembly, is constructed such that the burnable poisons are added into interposed areas and limited portions of the areas adjacent to the interposed areas of the fuel assemblies and the poisoning function due to the addition of the poisons are substantially eliminated at the final stage of the reactor operational cycle, so that the burnable poison absorbs the thermal neutrons and suppresses the mutual function (binding effect) of the neutrons in the fuel area holding the interposed area containing the poison before approaching the final stage even under the high temperature and high void operation condition, thus suppressing unnecessary excess reactivity during the reactor operational cycle. The arrangement or addition of the poison in the area referred to above suppresses the generation of the output power peak (power spike), thus maintaining the soundness of the fuel.

What is claimed is:

1. A water reactor core comprising:
a plurality of fuel assemblies each including a number of fuel rods,
at least some of the fuel rods including upper, lower, and middle enriched fissile areas, at least two of the upper, lower, and middle enriched fissile areas having different vertical widths, at least some of the fuel rods including upper and lower interposed areas not enriched in fissile nuclide at axial predetermined portions between areas of enriched fissile nuclide, the upper interposed area being between the upper and middle enriched fissile area, the lower interposed area being between the middle and lower enriched fissile areas, the interposed areas including natural or depleted uranium, the upper interposed area having a vertical width different than that of the lower interposed area, the vertical widths of both the upper and the lower interposed areas each being between about 3 and 8 centimeters, and wherein a burnable poison is added to fuel pellets located in fuel rods adjacent to the upper and lower interposed areas.

2. A water reactor core as set forth in claim 1, wherein said water reactor core is a pressurized water reactor core.

3. A water reactor core as set forth in claim 1, wherein said water reactor core is a boiling water reactor core.

4. A water reactor core as set forth in claim 1, wherein said water reactor core is a light water reactor core.

5. A water reactor core as set forth in claim 1, wherein the vertical width of the middle enriched fissile area is smaller than that of the upper and lower enriched fissile areas.

6. A water reactor core as set forth in claim 1, wherein the upper and lower interposed areas in each fuel assembly are arranged at the same level in the axial direction.

7. A water reactor core as set forth in claim 1, wherein at least one of the upper and lower interposed areas includes natural uranium or depleted uranium having a hollow portion.

8. A water reactor core according to claim 1, wherein at least one of the fuel assemblies has an interposed area positioned one-fourth of the distance down from the top of the fuel assembly.

9. A water reactor core according to claim 1, wherein the upper interposed areas are located at the same vertical level in each fuel assembly, and the lower interposed areas are located at the same level in each fuel assembly.

10. A water reactor core as set forth in claim 7, wherein the hollow portion forms a plenum for storing gas.

* * * * *